(No Model.)
J. T. SMITH.
DUSTER.
No. 264,358. Patented Sept. 12, 1882.
Fig. 1.
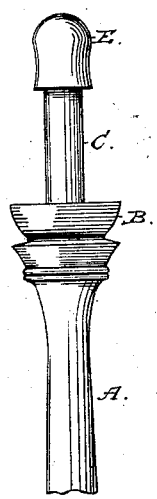
Fig. 2.
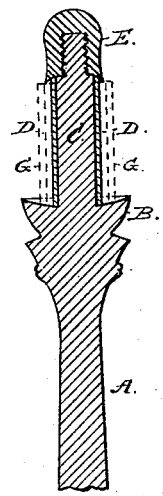
Fig. 3.
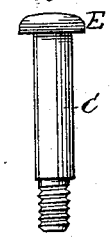
Fig. 5.
Fig. 4.
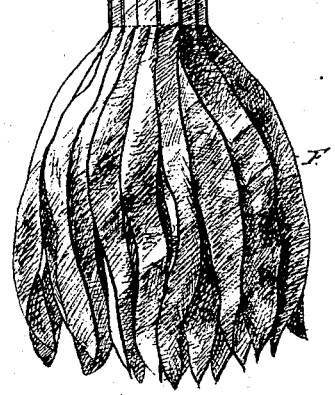
Attest:
F. W. Howard
Jno. R. Going
Inventor:
James T. Smith
by W. H. Doolittle
Attorney
N. PETERS, Photo-Lithographer, Washington, D. C.

UNITED STATES PATENT OFFICE.

JAMES T. SMITH, OF NEW YORK, N. Y.

DUSTER.

SPECIFICATION forming part of Letters Patent No. 264,358, dated September 12, 1882.

Application filed May 27, 1882. (No model.)

*To all whom it may concern:*

Be it known that I, JAMES T. SMITH, a citizen of the United States, residing at New York city, in the county of New York and State of New York, have invented certain new and useful Improvements in Dusters; and I do hereby declare the following to be a full, clear, and exact description of the invention, such as will enable others skilled in the art to which it appertains to make and use the same.

Manufacturers of articles made from silk, cotton goods, and other fabrics, especially manufacturers of parasols and umbrellas, have a large amount of shreds and pieces of material left, which generally is mere waste, and is thrown into the street. To utilize these waste pieces by working them up into dusters and brushes, and at the same time make a duster or brush that will have many advantages over feathers, bristles, and other similar materials used for that purpose in matters of softness, flexibility, cleanliness, and durability, are the objects of my improvement.

It consists of strips of waste silk or other material secured to a band, in combination with a handle having a cup-shaped flange at or near its lower end, a tube on which is wound and secured the band, and a screw-cap or holder to hold the material composing the duster upon the handle, all as hereinafter more particularly described.

The improvement is illustrated in detail in the accompanying drawings, in which Figure 1 is a perspective view of the completed article; Figs. 2, 4, and 5, detached views; and Fig. 3, a sectional view.

Like letters represent like parts in the several views.

A is the handle of the duster, provided at its lower end with an annular cup-shaped flange, B, extension C, and screw-cap E.

D is a short tube or inner case, composed of any suitable material, and formed to slide over and fit nicely to the extended portion C of the handle.

F represents the strips of material of which the duster is composed.

E is a screw-cap applied to the screw-threaded end of extension C; or the part C may be a separate piece and screw-threaded at its opposite end, as shown in Fig. 5, and inserted in a screw-threaded cavity in the handle, in which case E will be simply a knob, E', turned on lower end of C.

The duster is made up as follows: The strips of silk or other material which go to make up the duster may be doubled and attached to a band by double rows of stitching, and the outer strips plaited to give a neat outward finish to the duster, as indicated in dotted lines in Fig. 1. One end of the band is then secured to the tube D by glue, or in any other manner, the band wound upon it, and the last fold secured to the others by sewing, without the use of nails or rivets. The part C of the handle is then inserted in the tube and the screw-cap E applied, which forces the tube and surrounding band closely down on flange B and holds the same securely in place. The same result may be obtained when the whole of part C is used as a cap with the screw-threads on its opposite end by screwing the part C into the handle after the tube, with its wrapping, is placed thereon.

The strips F may be attached to the band in other ways than above set forth—as by gluing—and other forms and means of finishing may be adopted; but I prefer the manner described.

The tube affords convenient means for winding the band before applying it to the handle, and for holding the band in place upon the handle, although the band could be wound directly upon the handle on portion C and be confined within or on flange B by pressure of the screw-cap E.

It will be seen by this arrangement that by simply unfastening the end of the band, unwinding the same, and removing the tube a new band with new material can be easily and quickly applied when desired, or any part of the old band or material repaired or replaced. The loss of the handle with the wearing out of the duster is thus obviated. By forming the flange in cup shape and extending the shoulder of the screw-threaded holder the upper ends of the coiled band are compressed within the flange, giving a finished appearance to the exposed parts of the band and its attached strips, and providing a duster in which the separable parts are firmly and rigidly bound together by the action of the holder against the tube to which the band is attached. Besides thus utilizing strips of silk and other material which would be otherwise wasted, the article can be made one of much beauty by the selection and arrangement in one duster of strips of various colors.

Having thus described my invention, what I claim, and desire to secure by Letters Patent, is—

1. In a duster, the handle provided with an integral cup-shaped flange and an integral screw-threaded extension, in combination with a separate screw-threaded holder, substantially as shown and described.

2. In a duster, the combination of a cup-shaped flange, a central extension, a tube encircling said extension and having attached thereto strips of textile fabric, and a holder adapted to force and retain the tube and fabric within the flange, substantially as shown and described.

3. A duster comprising strips of textile fabric secured to a band wound flatly about a tube, and means for compressing the band endwise against a cup-shaped flange formed on the handle thereof, substantially as shown and described.

4. A duster comprising strips of textile fabric stitched to a band, the outer end of which is box-plaited to give it a finished appearance, and which is wound upon and secured to itself by stitches, and means for compressing the band endwise within a flange formed upon the handle, substantially as described.

In testimony whereof I affix my signature in presence of two witnesses.

JAMES THOMAS SMITH.

Witnesses:
 WM. S. MARSH,
 LEWIS LEFFERTS.